Patented Apr. 17, 1934

1,955,237

UNITED STATES PATENT OFFICE 1,955,237

PROCESS OF PURIFYING GLYCERINE

Alexander Jenny, Berlin-Charlottenburg, Germany, assignor to Siemens-Elektro-Osmose G. m. b. H., Siemensstadt, near Berlin, a corporation of Germany No Drawing. Application November 27, 1931, Serial No. 577,714. In Germany December 18, 1930

4 Claims. (Cl. 204—9)

My invention relates to a process of purifying glycerine, and more particularly to an electro-osmotic process of purifying glycerine, which has been subjected to a preparatory chemical purification process.

In order to free soluble silicic acid completely of the electrolyte, it has already been proposed to treat a water glass solution in the anode compartment of an electro-osmotic two-cell type apparatus whose membrane has an electro-negative character, and to continue the treatment of the liquid removed from the anode compartment into the middle compartment of an electro-osmotic three-cell type apparatus.

For the purification of glycerine by an electro-osmotic process it has formerly been suggested to employ either an electro-osmotic two-cell type apparatus or an electro-osmotic three-cell type apparatus, special membranes or diaphragms being selected to render the purification process as perfect as possible.

According to my invention the electro-osmotic purification of glycerine which has been subjected to a preparatory chemical purifying process is effected by removing the anions of the contaminating sebates and fatty acid esters by treating the glycerine solution in the cathode compartments of a two-cell type electro-osmotic apparatus, whereupon the glycerine solution is conveyed into the middle compartments of a three-cell type electro-osmotic apparatus and here subjected to further treatment. In this further treatment impurities containing alkaline ingredients are removed as well as any remaining imdients purities containing acid ingredients not removed in the initial treatment. By the new process an extremely surprising effect is obtained in so far as it is possible by this simple method to produce a glycerine, which considerably exceeds the purity figures of standard specifications.

The following may serve as examples for carrying out my improved osmotic purification process:

1. As starting material there is employed a saponificate-crude glycerine. 20 kgs. of this glycerine were diluted with 40 litres distilled water, subjected to a suitable chemical preliminary treatment and filtered. The filtrate contained 239 milligrams ash per litre and 33.4 per cent glycerine; the glycerine had a neutral reaction and was of bright yellow color.

The electro-osmosis was conducted in an apparatus which consisted of a row of two-cell units and an adjoining row of three-cell units, which were in communication with one another by siphons in such a way that the glycerine was able to pass continuously through the entire apparatus, first through the cathode chambers of the two-cell type apparatus and then through the middle compartments of the three-cell type apparatus.

The electrode compartments, that is all the anode compartments and the cathode compartments of the three-cell portion of the apparatus were filled with distilled water, which was likewise able to flow through siphons from anode compartment to anode compartment and from cathode compartment to cathode compartment. The supply of the glycerine to the apparatus was adjusted for a certain flow-through velocity, and the total quantity of solvent water for the electrode compartments was regulated to one quarter of the glycerine flow-through. In the two-cell part of the apparatus the electrodes were connected in parallel and to a source of direct current of 16 volts, while the electrodes of the three-cell unit were connected in series and to a source of direct current of 220 volts, with the exception of the two last electrodes which were individually connected to the 220 volts supply. All the membranes of the apparatus consisted of an Egyptian cotton fabric impregnated with chromium gelatine.

After filling the cells with the respective liquors the current was switched on and first a preliminary osmosis carried on for two hours with quiescent electrolytes and solvent water, and then the supply of glycerine water was set at 2 litres per hour and the supply of solvent water at 0.5 litre per hour; the solute escaping from the apparatus within the first two hours was collected separately as first runnings, whereupon the osmosis proper was started with the already set flow-through of 2 litres and 0.5 litre, respectively, per hour. After two hours osmose the glycerine flow-through was increased to 2.5 litres per hour while the solvent water remained unchanged, and the osmose continued for 1.5 hours longer. The two solutes (2 and 2.5 litres flow-through) were collected separately, their quantity and content of glycerine determined and the kilowatt-hour (k. w. h.) consumption computed per 1 kg. of 100 per cent glycerine:

Solute 1 consumed 0.214 k. w. h per 1 kg.
Solute 2 consumed 0.158 k. w. h. per 1 kg.

The solutes (osmosates) concentrated in a vacuum still had a faint yellow tint; they were filtered over 0.1 per cent decolorizing charcoal. The determination of ash according to standard specifications showed a complete absence of ash and the test with ammoniacal silver solution the absence of reducing substances. The concentrates were colorless and odorless. The determination of the saponification value according to standard specifications showed the consumption of 0.7 cubic centimetres N/10 potash lye for solute 1, and 0.8 ccm. for solute 2.

2. As starting material for this process a so-called dynamite glycerine was used, that is the first distillate of an under-lye. Its color was brownish-yellow and it had a disagreeable smell. The content of glycerine was 98.6 per cent, the saponification value according to standard specifications showed a consumption of 14.4 cubic centimetres N/10 potash lye.

12.6 kgs. of this glycerine were diluted with 20 litres of distilled water, subjected to a preliminary chemical purification process and filtered. The analysis of the filtrate showed an ash content of 0.0071 per cent (71 milligrams per litre) and a glycerine content (according to Gerlach) of 38.3 per cent. The color was bright yellow.

The electro-osmotic treatment took place in the apparatus described in Example 1. After two hours preliminary osmose and one hours displacement of the first running, osmose was conducted at three different flow-through velocities, the three solutes were collected separately, and their volumes and glycerine content determined as follows.

|  | Flow-through (litres per hour) | Duration (hours) | k. w. h. per 1 kg. (100 per cent glycerine) |
|---|---|---|---|
| Solute 1 | 2 | 3 | 0.0943 |
| Solute 2 | 2.5 | 2.33 | 0.0776 |
| Solute 3 | 3 | 2 | 0.0753 |

The concentrates of these solutes, obtained by concentration in a vacuum and filtration over 0.2 per cent decolorizing charcoal, were free from ash; no reducing substances (silver reaction) were present.

The saponification values determined according to standard specifications were

For solute 1, 0.8 cubic centimetres N/10 potash lye
For solute 2, 0.8 cubic centimetres N/10 potash lye
For solute 3, 1.2 cubic centimetres N/10 potash lye The concentrates were colorless and odorless.

3. In the experiment described in the following the greatest importance was attached to the determination of the losses in glycerine occurring during the osmosis, due to the migration of glycerine into adjacent electrode compartments.

As starting material a crude glycerine saponificate of yellow color was used. After the dilution with water and preparatory chemical treatment a glycerine liquor with 38.05 per cent of glycerine and 263 milligrams ash per litre was obtained.

This product was subjected to an electro-osmotic treatment in the apparatus described in Example 1. After a preliminary osmosis of two hours duration with quiescent liquors and after displacement of the preliminary osmosate the process was continued at different flow-through velocities of the glycerine liquor to be purified, viz:

With 2 litres flow-through per hour, 17¼ hours, solute I
With 2.5 litres flow-through per hour, 13 hours, solute II
With 3 litres flow-through per hour, 11 hours, solute III
With 3.5 litres flow-through per hour, 9½ hours, solute IV
With 4 litres flow-through per hour, 6½ hours, solute V.

The quantity of solvent water of the electrode compartments amounted in the case of the solutes I and II to 0.375 litres per hour, in the case of the solutes III to V 0.7 litres per hour.

The solutes I to III resulted in concentrates free from ash and to which no objection could be raised, while the concentrates of the solutes IV and V already showed weighable quantities of ash, 0.0002 gram being determined in the solute IV and 0.0004 gram ash in the solute V in 5 cubic centimetres of concentrate.

The k. w. h.-consumption for the individual solutes amounted to:

Solute I: 0.209 per 1 kg. 100 per cent glycerine
II: 0.215 per 1 kg. 100 per cent glycerine
III: 0.195 per 1 kg. 100 per cent glycerine
IV: 0.143 per 1 kg. 100 per cent glycerine
V: 0.195 per 1 kg. 100 per cent glycerine or on the average 0.191 k. w. h.

Altogether 56,114 kgs. of 100 per cent glycerine were worked up and in the anode and cathode liquors 729,722 g. of glycerine were found, as determined by the bichromate method, that is, 1.30 per cent of the quantity under treatment. It must, however, be pointed out that this loss of glycerine due to migration into the cathode compartments is only the apparent loss, since in determining the oxidation value by means of bichromate all the oxidizable impurities removed from the glycerine which migrated into the electrode compartments are included. The real loss in glycerine thus remains considerably below the oxidation value determined.

The electro-osmotic purification of glycerine according to my invention, subdivided or split up into a plurality of working processes or stages, may be carried out in a continuous manner, by, for instance in the case of two working processes, arranging a plurality of two-cell type apparatus one behind the other, so that the glycerine solution to be purified flows through the various cathode compartments in succession by the aid of siphons or any other suitable provisions, to reach from there again by means of siphons or the like the central compartments of the adjacent three-cell type apparatus, which the glycerine liquor traverses in succession, until after complete purification it issues from the last central compartment and is collected in suitable vessels, in order to be concentrated in known manner by distillation in a vacuum and, if necessary, to be filtered over decolorizing charcoal.

The glycerine purified is, in particular, entirely free from arsenic.

I claim as my invention:

1. The process of electro-osmotically purifying glycerine which comprises removing from the glycerine impurities containing acid ingredients such as the anions of the contaminating sebates and fatty acid esters by treating the glycerine electrolytically in the cathode compartment of a 2-cell type electro-osmotic apparatus, conveying the glycerine solution into the middle compartment of a 3-cell type electro-osmotic apparatus and removing impurities containing alkaline ingredients as well as any remaining impurities containing acid ingredients by continuing the electro-osmotic treatment in said 3-cell type apparatus.

2. The process of claim 1 wherein a higher voltage is employed across the electrodes of the 3-cell type than across the electrodes of the 2-cell type electro-osmotic apparatus.

3. The process of electro-osmotically purifying glycerine which has been subjected to a preparatory chemical purifying process, which comprises removing from a glycerine solution the impurities containing acid ingredients such as the contaminating sebates and fatty acid esters by treating the glycerine solution electrolytically in the cathode compartment of a 2-cell type electro-osmotic apparatus, conveying the glycerine solution into the middle compartment of a 3-cell type electro-osmotic apparatus and removing impurities containing alkaline ingredients as well as any remaining impurities containing acid ingredients by continuing the electro-osmotic treatment therein, the said glycerine solution flowing continuously through the 2-cell type and the 3-cell type electro-osmotic apparatus during the course of the purification.

4. A continuous process of purifying glycerine by electro-osmotic action which comprises electrolyzing the glycerine to be purified while passing it in a continuous stream to and through the cathode compartments of a 2-cell type electro-osmotic apparatus thereby removing impurities containing acid ingredients, then passing said continuous stream to and through the middle compartments of a 3-cell type electro-osmotic apparatus thereby removing impurities containing alkaline ingredients as well as any remaining impurities containing acid ingredients, simultaneously passing a stream of water through the anode compartments of the 2-cell type electro-osmotic apparatus and through the anode and cathode compartments of the 3-cell type electro-osmotic apparatus, and recovering the resulting electro-osmotically purified glycerine.

ALEXANDER JENNY.